United States Patent
Lee

(10) Patent No.: US 11,458,656 B2
(45) Date of Patent: Oct. 4, 2022

(54) METHOD OF FORMING ALIGNED PATTERNS ON MAT

(71) Applicant: Gum Tech Co., Ltd., New Taipei (TW)

(72) Inventor: Ko-Hung Lee, Taichung (TW)

(73) Assignee: Gum Tech Co., Ltd, New Taipei (TW)

( * ) Notice: Subject to any disclaimer, the term of this patent is extended or adjusted under 35 U.S.C. 154(b) by 399 days.

(21) Appl. No.: 16/513,987

(22) Filed: Jul. 17, 2019

(65) Prior Publication Data

US 2021/0016472 A1    Jan. 21, 2021

(51) Int. Cl.
*B29C 41/34* (2006.01)
*B29C 41/02* (2006.01)
*B29L 31/00* (2006.01)

(52) U.S. Cl.
CPC .............. *B29C 41/34* (2013.01); *B29C 41/02* (2013.01); *B29C 2795/007* (2013.01); *B29L 2031/7324* (2013.01)

(58) Field of Classification Search
None
See application file for complete search history.

(56) References Cited

U.S. PATENT DOCUMENTS

| 10,582,793 | B1* | 3/2020 | McMahan | ................. B32B 5/32 |
| 2010/0199427 | A1 | 8/2010 | Anderson | |
| 2017/0326810 | A1* | 11/2017 | Neill | ....................... B29C 65/08 |

FOREIGN PATENT DOCUMENTS

JP    3209420 U    3/2017

OTHER PUBLICATIONS

Search Report for Application No. GB1910219.3 dated Jan. 18, 2021.

* cited by examiner

*Primary Examiner* — Jacob T Minskey
*Assistant Examiner* — Adrien J Bernard
(74) *Attorney, Agent, or Firm* — Alan D. Kamrath; Karin L. Williams; Mayer & Williams PC

(57) ABSTRACT

A method of forming aligned patterns on a mat contains steps of: (1). providing a main die configured to mold a body on a substrate; (2). forming multiple patterns on the body so as to produce a decoration portion; (3). forming a toothed cutting line on the body by ways of the alignment mark line so as to form multiple connection units on which multiple patterns are formed respectively, thus producing the mat; and (4). aligning the multiple patterns on the mat so as to provide or design the decoration portion on the multiple patterns, wherein the mat is disassembled to multiple coupling parts, and the multiple coupling parts of the mat are connected with another mat, thus producing an expandable mat.

5 Claims, 8 Drawing Sheets

METHOD OF FORMING ALIGNED PATTERNS ON MAT

FIELD OF THE INVENTION

The present invention relates to a method of forming aligned patterns on a met by which the mat is disassembled to multiple coupling parts, and the multiple coupling parts of the mat are connected with another mat, thus producing an expandable mat on which multiple patterns are aligned.

BACKGROUND OF THE INVENTION

A conventional mat contains multiple connection units on which multiple patterns are formed and aligned, wherein the multiple patterns are numbers, English characters, phonetic notations, marks. The conventional mat is made of foaming material and is flexible.

To enhance aesthetics appearances and safety, the patterns are printed on the mat.

Referring to FIG. 8, a conventional method of making a mat contains steps of:

Forming, multiple first patterns 3a on a body 2a in a printing manner, a transfer printing manner, and a film adhering manner so as to reduce fabrication cost.

However, the multiple first patterns 3a on the body 2a are not aligned with multiple second patterns 5a on multiple connection units 21a of the body 2a respectively. The multiple connection units 21a are connected on the body 2a by using a tooth mold 4a and a toothed cutting line 41a. Thus, the multiple first patterns 3a are not aligned with the multiple second patterns 5a individually after cutting the multiple connection units 21a.

The present invention has arisen to mitigate and/or obviate the afore-described disadvantages.

SUMMARY OF THE INVENTION

The primary aspect of the present invention is to provide a method of forming aligned patterns on a met by which the mat is disassembled to multiple coupling parts, and the multiple coupling parts of the mat are connected with another mat, thus producing an expandable mat on which multiple patterns are aligned.

To obtain the above aspect, a method of forming aligned patterns on a met provided the present invention contains steps of:

(1). providing a main die configured to mold a body on a substrate;

(2). forming multiple patterns on the body so as to produce a decoration portion;

(3). forming a toothed cutting line on the body by ways of the alignment mark line so as to form multiple connection units on which multiple patterns are formed respectively, thus producing the mat; and (4). aligning the multiple patterns on the mat so as to provide or design the decoration portion on the multiple patterns, wherein the mat is disassembled to multiple coupling parts, and the multiple coupling parts of the mat are connected with another mat, thus producing an expandable mat.

Preferably, the decoration design is formed on the body in any one of a coating manner, a printing manner, and a transfer printing manner.

Preferably, a film is matingly adhered on the decoration design.

Preferably, the expandable mat is formed by the multiple patterns or other different patterns which are connected and aligned.

Preferably, an alignment mark line is formed around a peripheral side of the decoration portion.

DETAILED DESCRIPTION OF THE PREFERRED EMBODIMENTS

Figure 1:
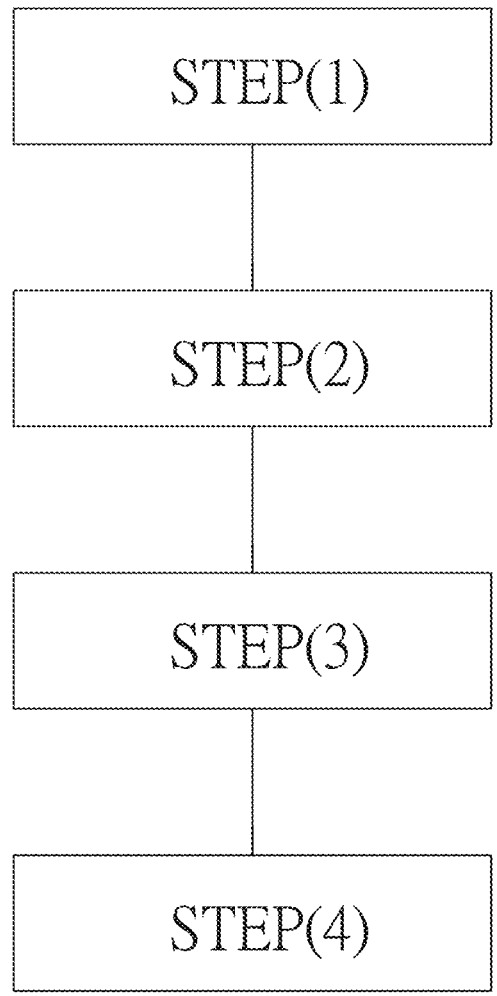
FIG. 1 is a flow chart of a method of forming aligned patterns on a mat according to a preferred embodiment of the present invention.
Figure 2:
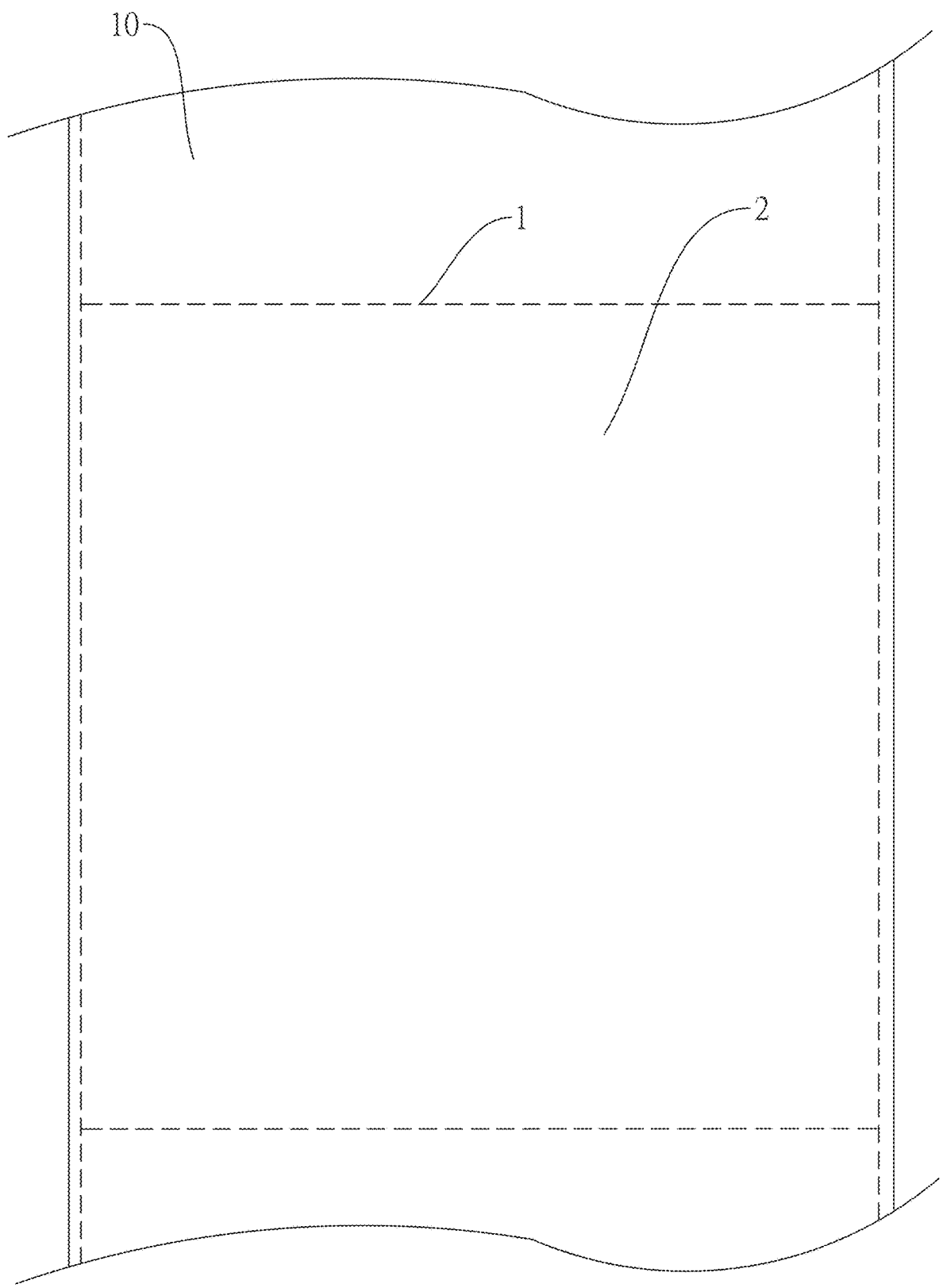
FIG. 2 is a schematic view showing a step of the method of forming aligned patterns on the mat according to the preferred embodiment of the present invention.
Figure 3:
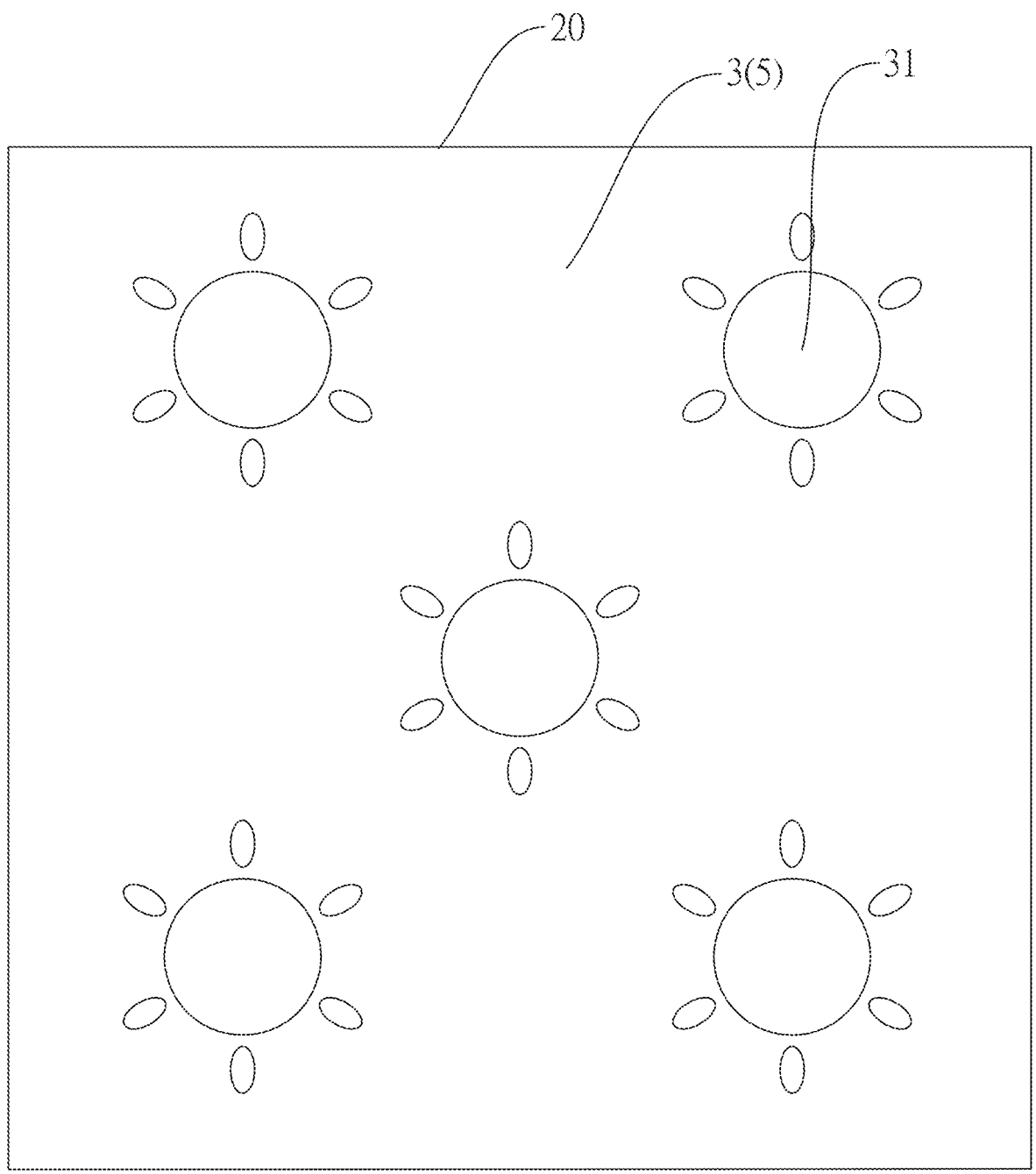
FIG. 3 is a schematic view showing another step of the method of forming aligned patterns on the mat according to the preferred embodiment of the present invention.
Figure 4:
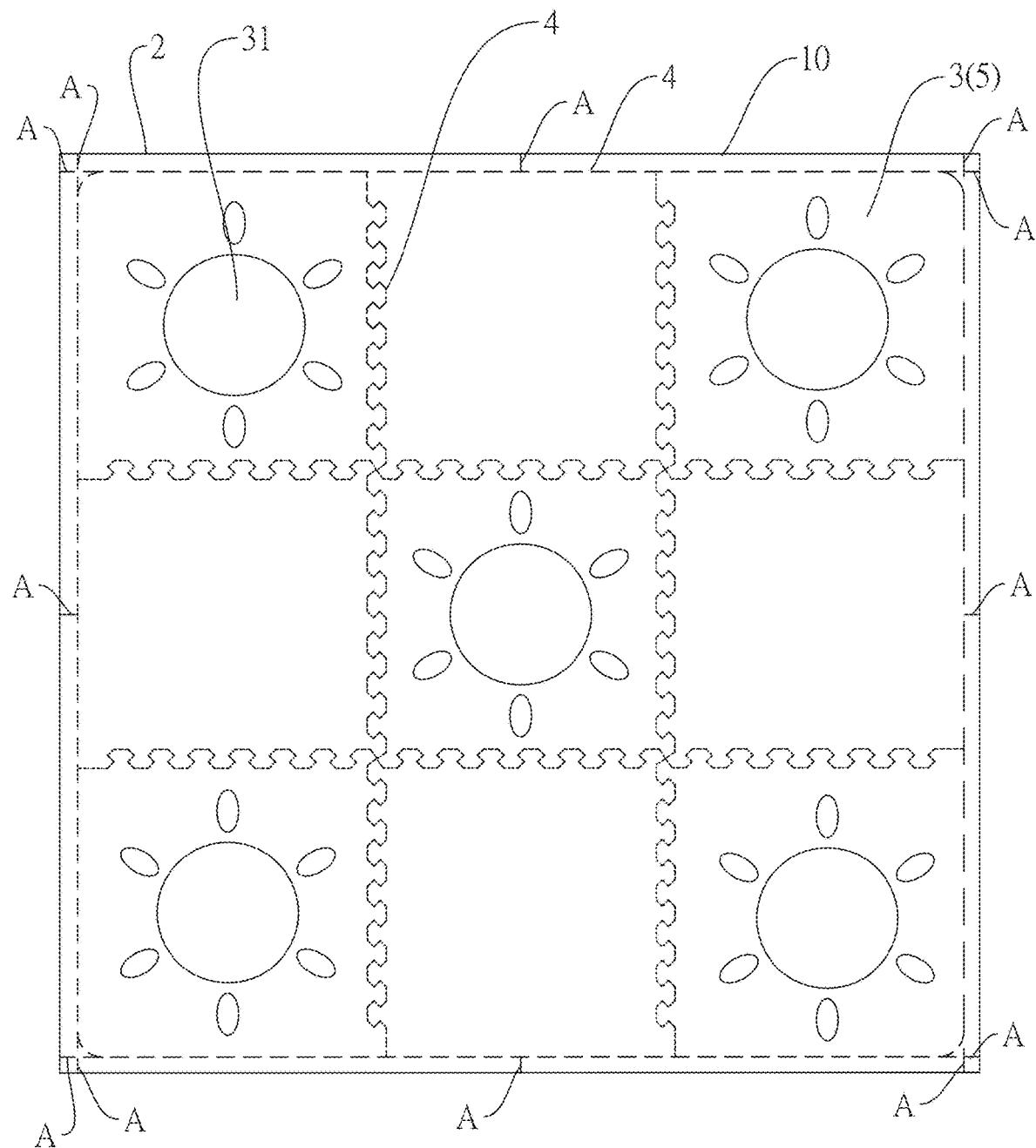
FIG. 4 is a schematic view showing another step of the method of forming aligned patterns on the mat according to the preferred embodiment of the present invention.
Figure 5:
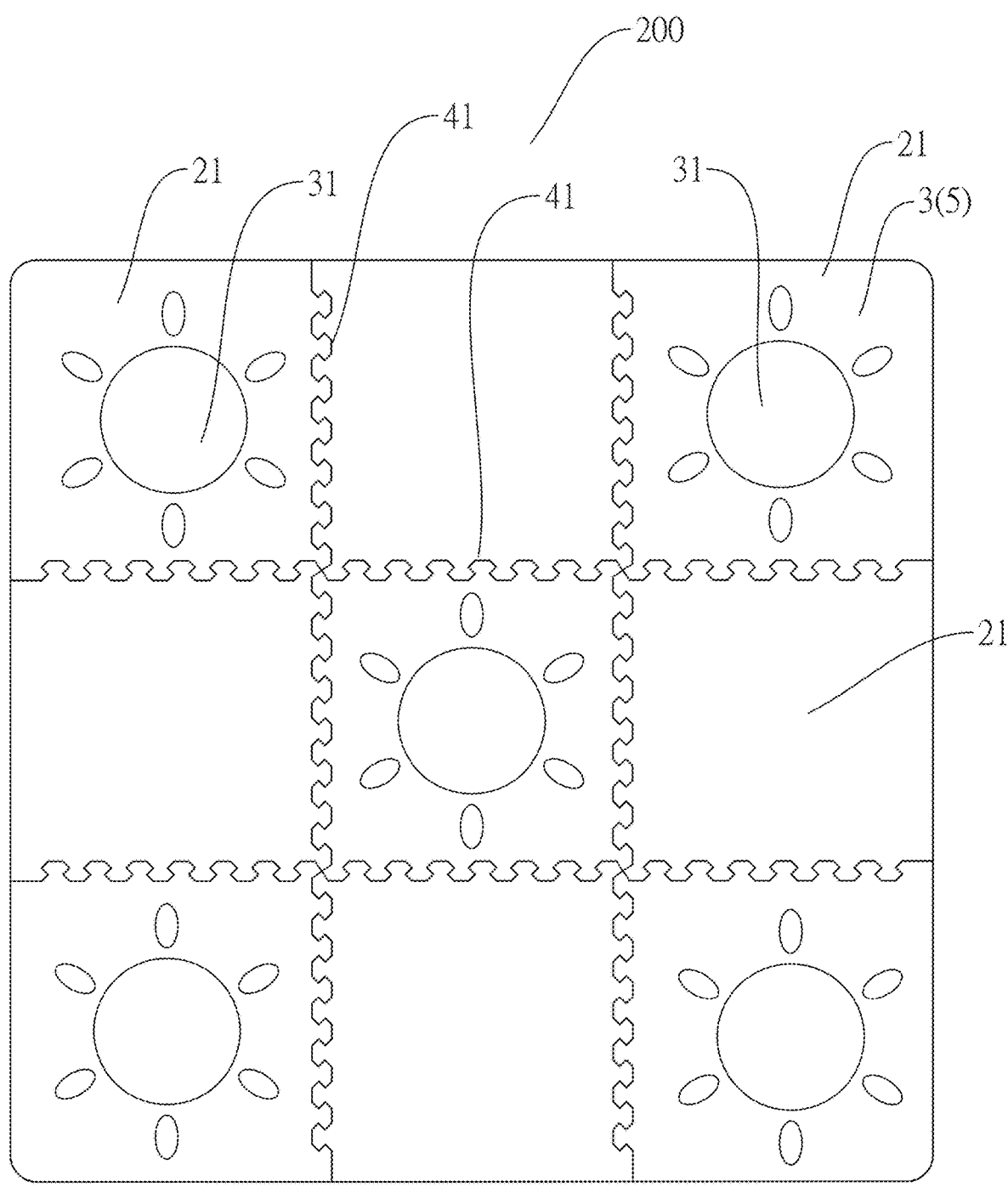
FIG. 5 is a schematic view showing another step of the method of forming aligned patterns on the mat according to the preferred embodiment of the present invention.
Figure 6:
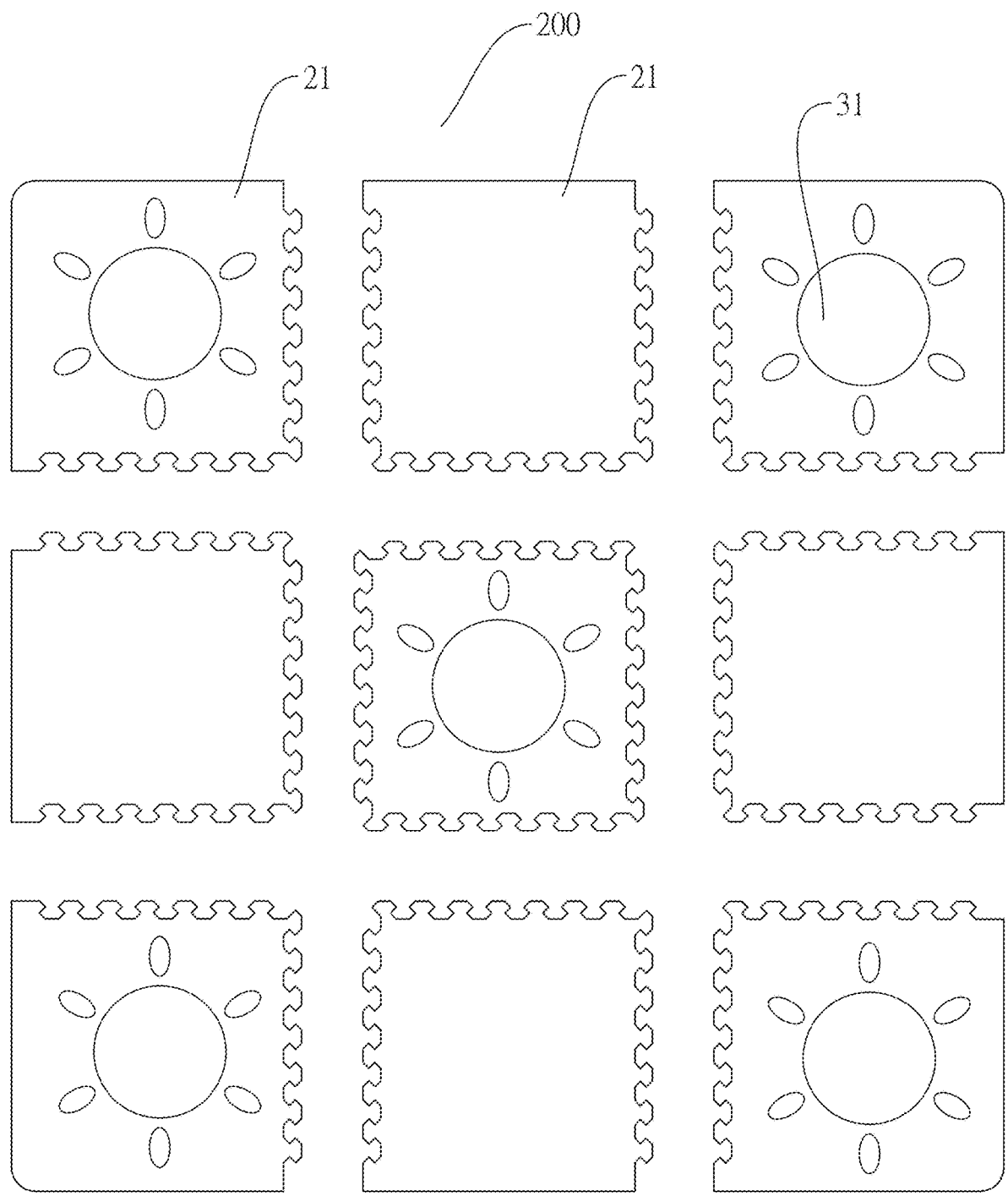
FIG. 6 is a schematic view showing another step of the method of forming aligned patterns on the mat according to the preferred embodiment of the present invention.
Figure 7:
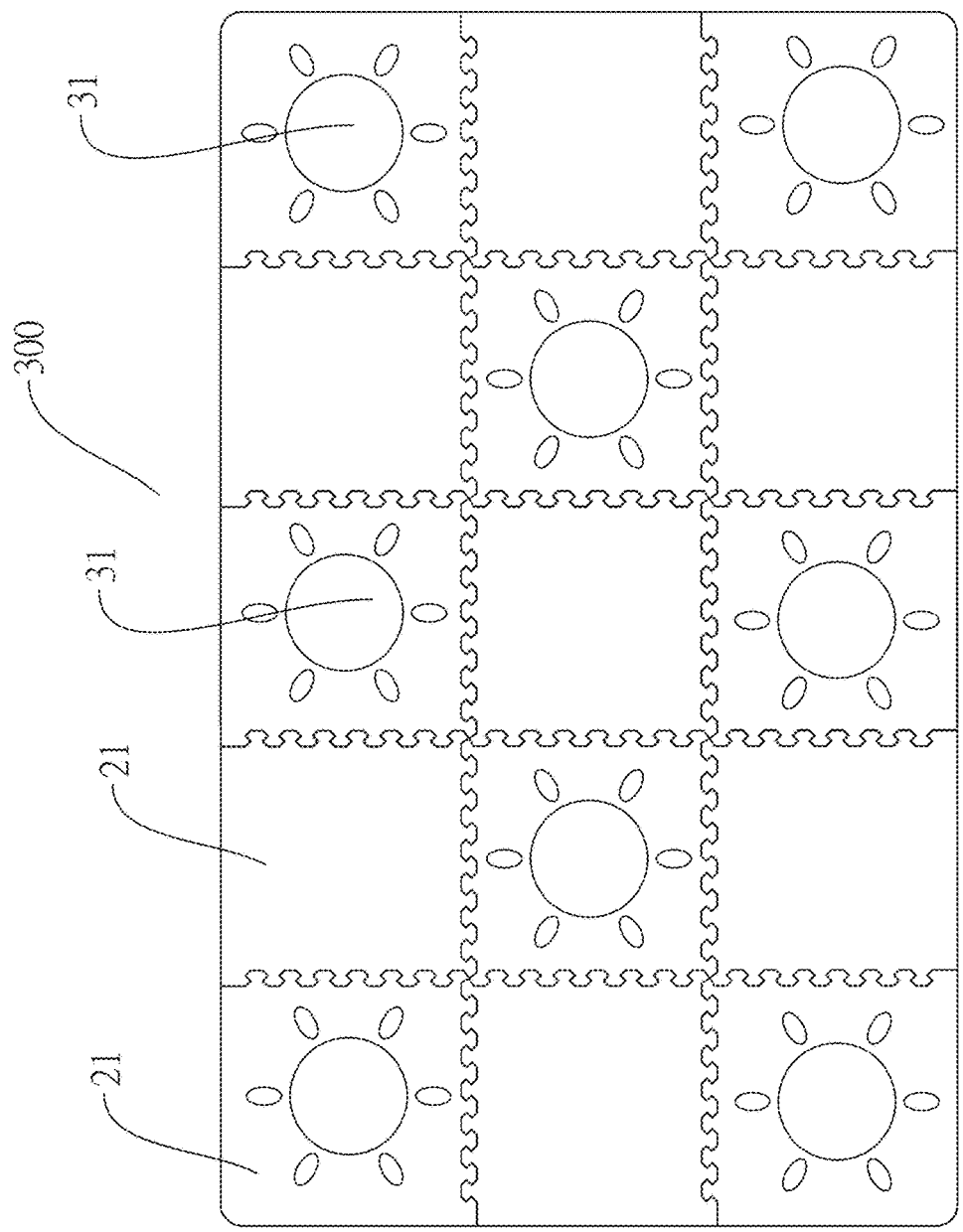
FIG. 7 is a schematic view showing another step of the method of forming aligned patterns on the mat according to the preferred embodiment of the present invention.
Figure 8:
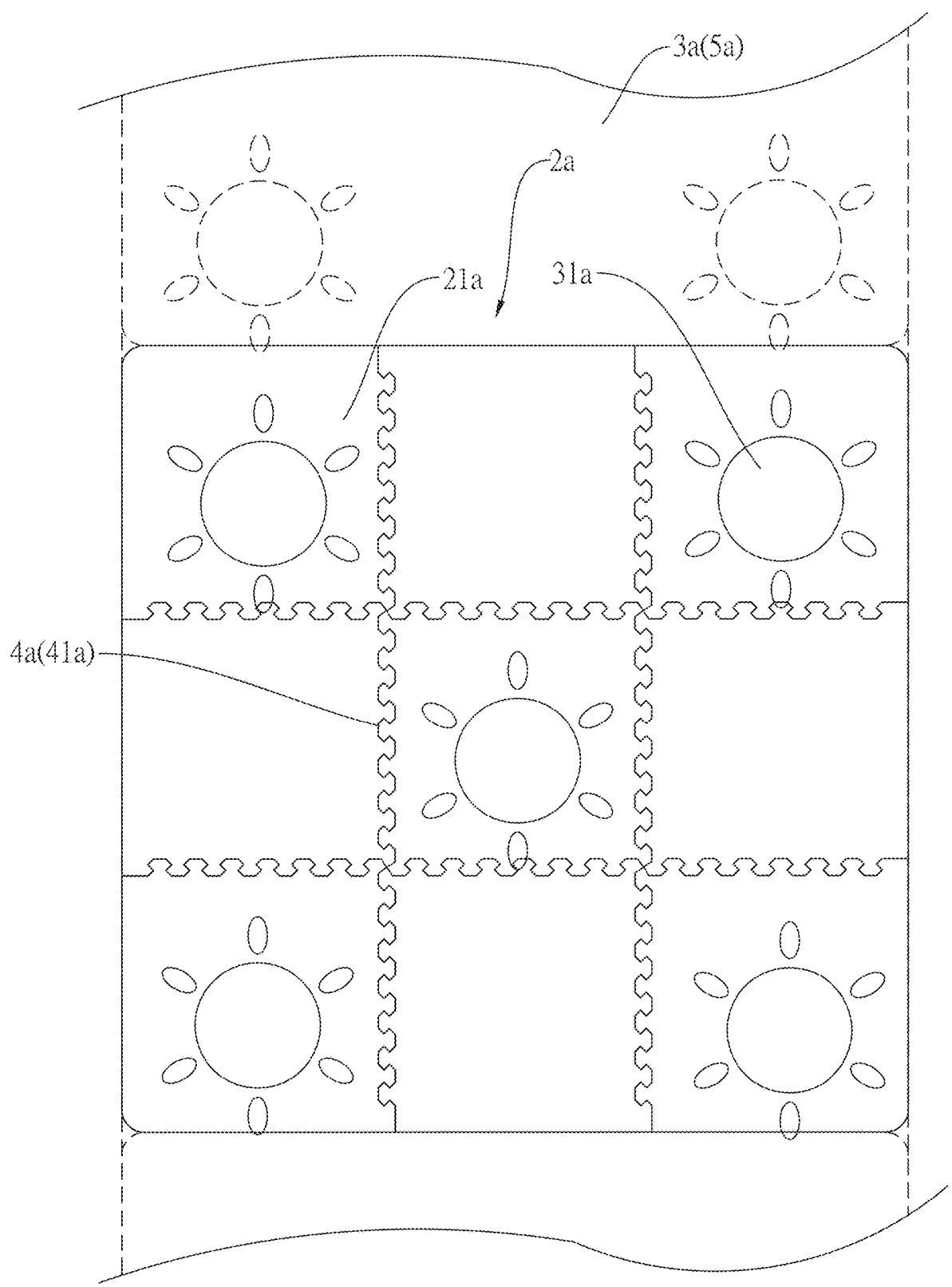
FIG. 8 is a schematic view showing a conventional method of forming aligned patterns on the mat according to the preferred embodiment of the present invention.

With reference to FIGS. 1-7, a method of forming aligned patterns on a mat according to a preferred embodiment of the present invention comprises steps of:

(1). providing a main die 1 configured to mold a body 2 on a substrate 10, wherein a shape of the body 2 corresponds to the main die 1, as shown in FIG. 2, and the shape of the body 2 is quadrilateral (such as square);

(2). forming multiple patterns 3 or 5 on the body 2 so as to produce a decoration portion 20, wherein an alignment mark line A is formed around a peripheral side of the decoration portion 20 so that the decoration portion 20 is aligned with the alignment mark line A by using a laser ray before being molded, and the decoration portion 20 is located on a predetermined position of a tooth die 4, wherein a decoration design 3 is formed on the body 2 in any one of a coating manner, a printing manner, and a transfer printing manner, wherein a film 5 is matingly adhered on the decoration design 3 so as to protect the decoration portion 20 (as shown in FIG. 3) and to enhance a service life of the decoration portion 20;

(3). forming a toothed cutting line 41 on the body 2 by ways of the alignment mark line A so as to form multiple connection units 21 on which multiple patterns 31 are formed respectively, thus producing the mat 200 (as illustrated in FIG. 4);

(4). aligning the multiple patterns 3 on the mat 200 so as to provide or design the decoration portion 20 on the multiple patterns 3, as shown in FIGS. 5 and 6, wherein the mat 200 is disassembled to multiple coupling parts, and the multiple coupling parts of the mat 200 are connected with another mat 200, thus producing an expandable mat 300 on which multiple patterns 31 are aligned.

Thereby, the expandable mat 300 are formed by the multiple patterns 3 or other different patterns which are connected and aligned.

The main die 1 is configured to mold the body 2 on the substrate 10, the multiple patterns 3 or 5 are formed on the body 2 so as to produce the decoration portion 20, the alignment mark line A is formed around the peripheral side of the decoration portion 20 so that the decoration portion 20 is aligned with the alignment mark line A by using the laser ray before being molded, and the decoration design 3 is formed on the body 2, wherein the toothed cutting line 41 is formed on the body 2 by ways of the tooth die 4 so as to form multiple connection units 21 connected together, thus producing the mat 200. Preferably, the decoration design 3 is located on the mat 200, and multiple mats 200 are connected to produce the expandable mat 300.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention

What is claimed is:

1. A method of forming aligned patterns on a mat comprising:
   providing a main die configured to mold a body on a substrate;
   aligning multiple patterns with an alignment mark;
   forming the multiple patterns on the body so as to produce a decoration portion, wherein the alignment mark is formed around a peripheral side of the decoration portion and the decoration portion is aligned with the alignment mark;
   forming a plurality of toothed cutting lines on the body aligned with the alignment mark so as to form multiple connection units on which the multiple patterns are formed respectively, thus producing the mat; and
   aligning the multiple patterns on the mat so as to provide the decoration portion on the multiple patterns, wherein the mat is configured to be disassembled to multiple coupling parts and such that the multiple coupling parts of a first mat are configured to be connected with another mat, thus producing an expanded mat with the multiple patterns aligned.

2. The method as claimed in claim 1, wherein the decoration portion is formed on the body in any one of a coating manner, a printing manner, and a transfer printing manner.

3. The method as claimed in claim 1, wherein a film is matingly adhered on the decoration portion.

4. The method as claimed in claim 1, wherein the expanded mat is formed by the multiple patterns or other different patterns which are connected and aligned.

5. The method as claimed in claim 1, wherein the alignment mark line is formed around a peripheral side of the decoration portion.

* * * * *